United States Patent [19]

Siverling

[11] Patent Number: 5,023,770

[45] Date of Patent: Jun. 11, 1991

[54] HIGH-SPEED PRESS CONTROL SYSTEM

[75] Inventor: Erich H. Siverling, Wauwatosa, Wis.

[73] Assignee: Square D Company, Palatine, Ill.

[21] Appl. No.: 179,743

[22] Filed: Apr. 11, 1988

[51] Int. Cl.$^5$ .............................................. G06F 9/00
[52] U.S. Cl. ..................................... 364/140; 364/147
[58] Field of Search ............... 364/140, 141, 146, 147, 364/136

[56] References Cited

U.S. PATENT DOCUMENTS

| 4,122,519 | 10/1978 | Bielawski et al. | 364/146 |
| 4,129,901 | 12/1978 | Masuda | 364/141 |
| 4,404,651 | 9/1983 | Grudowski | 364/140 |
| 4,716,541 | 12/1987 | Quatse | 364/900 |
| 4,742,443 | 5/1988 | Rohn et al. | 364/136 |
| 4,807,178 | 2/1989 | Fujiwara et al. | 364/140 |

Primary Examiner—Allen R. MacDonald
Attorney, Agent, or Firm—Michael J. Femal; Thomas K. Stine

[57] ABSTRACT

A high-speed press control system including a control processor and an associated scan processor for executing a press algorithm providing timed interrupts and consisting of identical programmable sub-algorithms to control output and input registers. The high-speed press control system has the capability of monitoring and reacting to press position every 2.5 ms.

8 Claims, 4 Drawing Sheets

FIG-2-
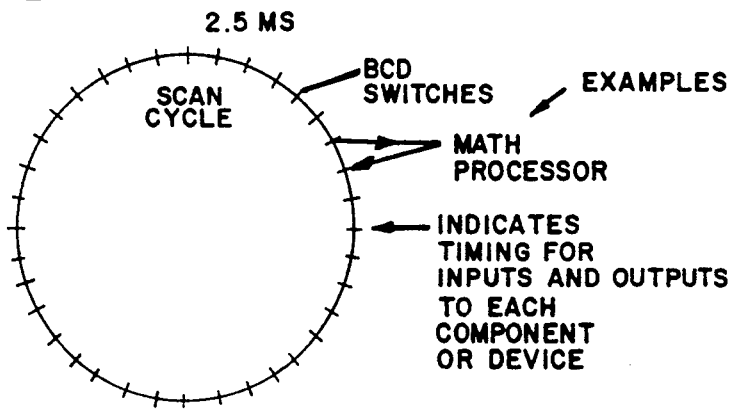
FIG-3-
PUNCH PRESS ALGORITHM
SUBALGORITHMS
1 — — — — — — — — — — — — — — — — 64
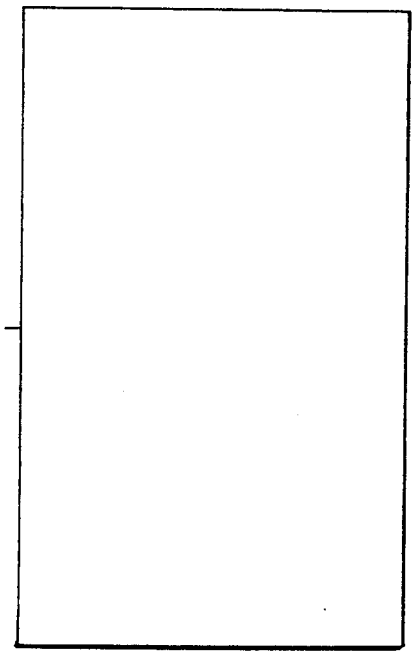
PUNCH PRESS ALGORITHM COMPRISES 64 SUBALGORITHMS.
EACH SUBALGORITHM COMPRISES 15 REGISTERS
1ST THROUGH 13TH REGISTERS PROVIDE DATA
14TH AND 15TH REGISTER PROVIDE OUTPUT OR STATUS

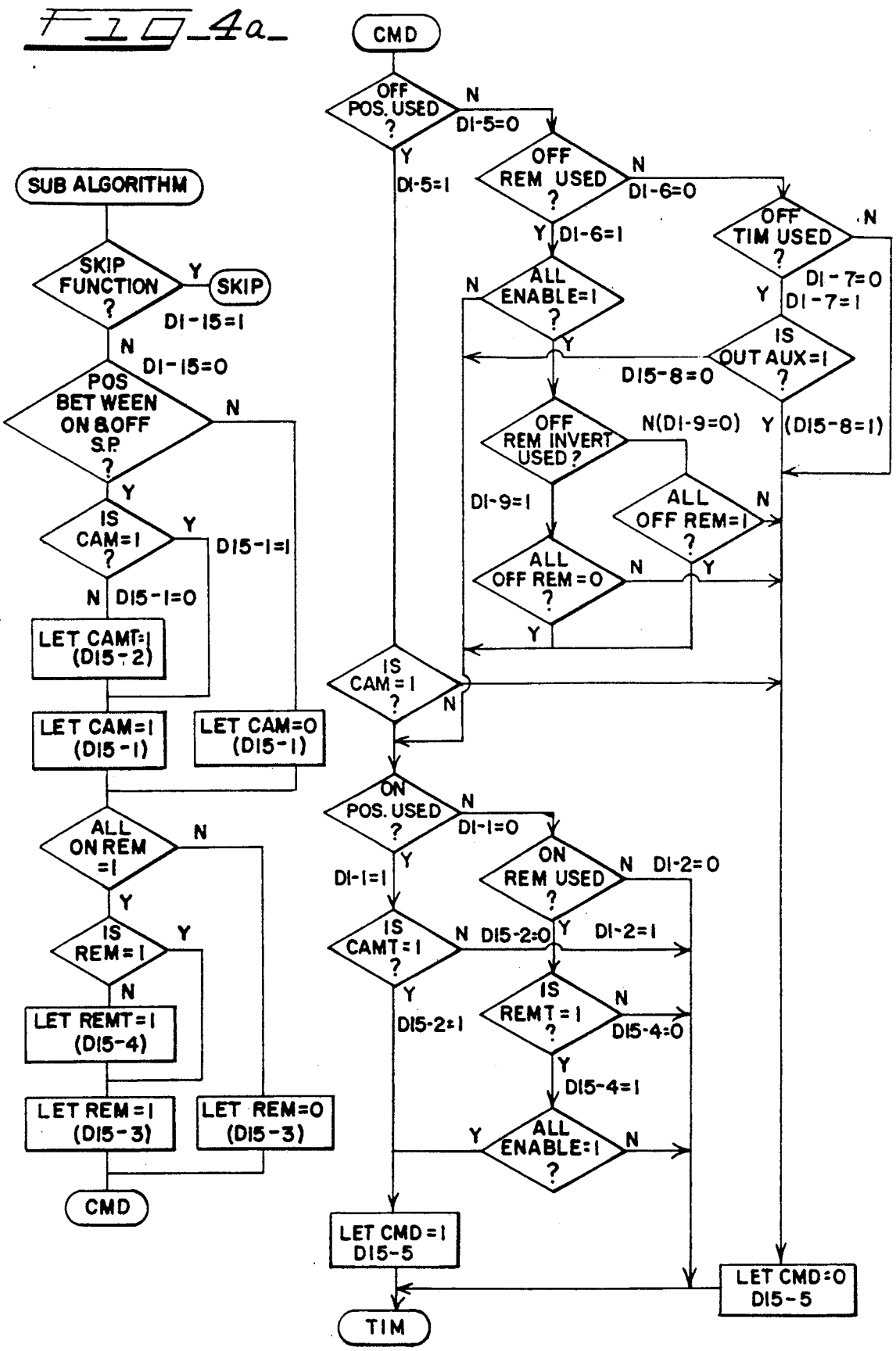

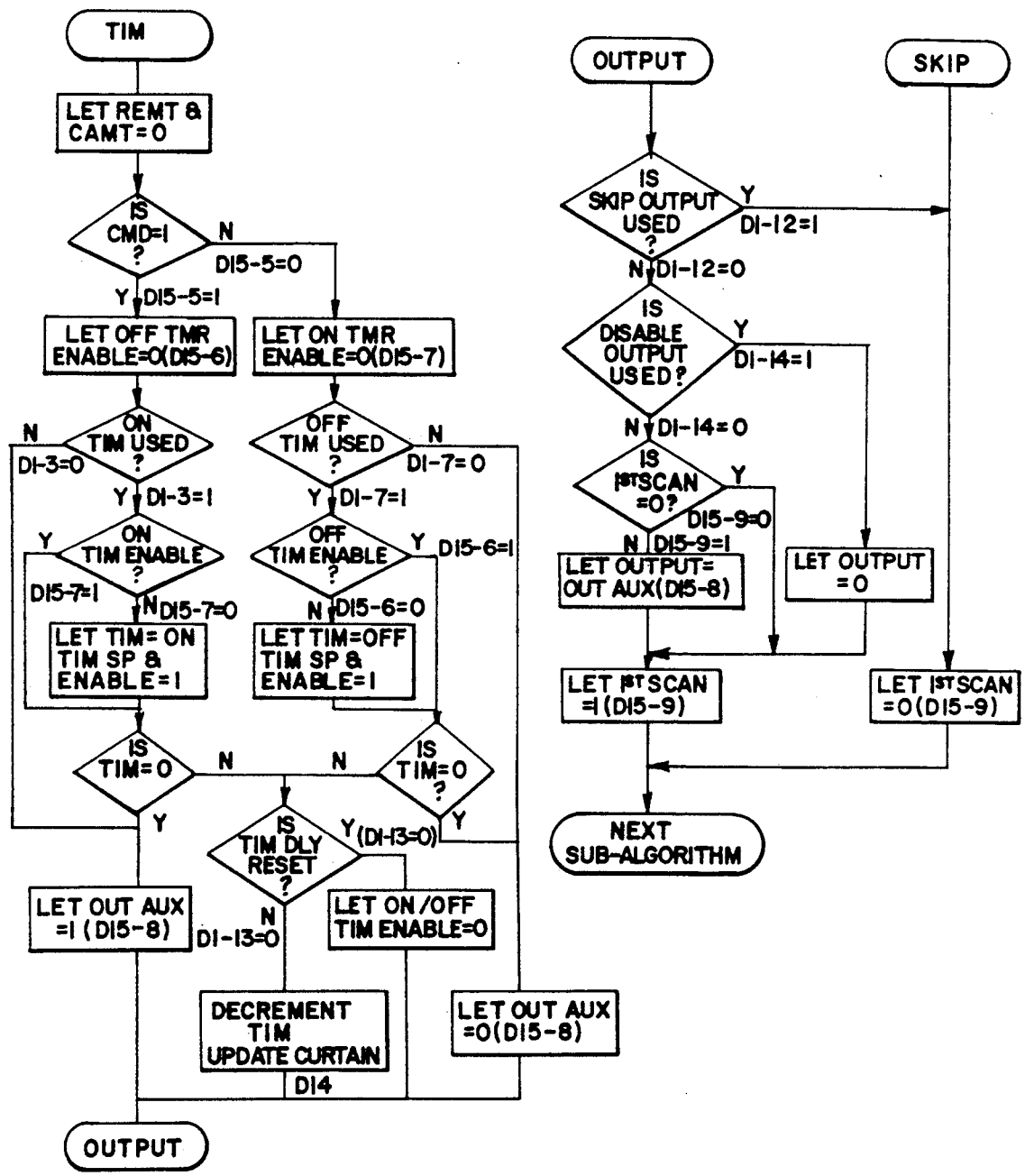

HIGH-SPEED PRESS CONTROL SYSTEM

DESCRIPTION

1. Reference to Related Applications

This application is related to applications filed concurrently herewith, entitled "Network Communications System" Ser. No. 07/179,969, filed Apr. 11, 1988; "Ladder Sequence Controller" Ser. No. 07/180,093, filed Apr. 11, 1988; "Peer-To-Peer Register Exchange Controller for PLCs" Ser. No. 07/179,674, filed Apr. 11, 1988, U.S. Pat. No. 4,897,777, issued Jan. 30, 1990; and, "Network Interface Board System" Ser. No. 07/179,756, filed Apr. 11, 1988. The contents of these applications are incorporated herein by reference.

2. Technical Field

This invention relates generally to programmable logic controllers that control the operation of machine tools, and in particular this invention relates to a programmable logic controller containing instructions for controlling a high-speed punch press including material supply and removal.

3. Background Prior Art

Programmable logic controllers (PLCs) that control the operation of a punch press comprise a microprocessor-based controller that includes a microprocessor, memory and instructions contained in the memory for sensing the condition of the various parts of the punch press and affecting timed opening and closing of switches and valves for proper operation of the punch press.

Punch presses are often required to operate with auxiliary functions, such as feeders, lifters, extractors, etc. Automation valve solenoids are required to operate at specific positions of each press stroke. Each automation valve solenoid must be capable of being turned ON and OFF at programmable slide positions (with or without an adjustable time delay) or based on remote contact status (again with or without a time delay). Since these operations may have to occur within a degree of the programmed setpoint, scan and I/O update time are critical.

PLCs have operated according to rung ladder diagrams that substantially emulate the older relay logic previously used to control punch press operations. In the prior art, the fastest that a punch press could be operated would be substantially 30 strokes per minute in conjunction with turning on and off approximately 8 valves or switches. This substantially inhibits high-speed punch press operation where the punch press itself could operate at more than twice that speed. Speeding up the cycle time of the microprocessor in the PLC achieves some increase in speed in operating the punch press, but fails to achieve the necessary punch press operational speed.

SUMMARY OF THE INVENTION

In accordance with the invention, a programmable logic controller (PLC) of the invention achieves a punch press operation of substantially 120 strokes per minute with operation of a maximum of 64 valves or switches. The invention substantially multiplies the punch press speed through a particular sequence of microprocessor instructions that operates at multiples of 2.5 milliseconds.

As the specified number of strokes a press is called upon to execute per minute keep increasing, these speed requirements necessitate the development of a new approach. The most viable means of achieving the desired speed is to incorporate the automation algorithm itself in the executive software of the scan processor. When enabled, this algorithm can be executed as part of the control processor's regular 2.5 ms interrupt. Necessary set-up parameters, such as position, time and remote contact status, can be passed to the image memory of the processor by establishing a function block of registers in which the location of this information is specified by the user. The start of such a function block is established by enabling a SPECIAL LET statement in the user program. Output (valve) bits will be turned ON or OFF in the real world each time the algorithm is executed by the scan processor, effectively providing the PLC with the ability to monitor and react to press position every 2.5 ms.

BRIEF DESCRIPTION OF DRAWINGS

FIG. 2 is a circle diagram illustrating some of the timing involved in the programmable logic controller of the invention;

FIG. 3 is a block diagram showing the press, algorithm function block structure; and, FIGS. 4A and 4B show a flow chart of an, sub-algorithm flow diagram.

DETAILED DESCRIPTION

Figure 1:
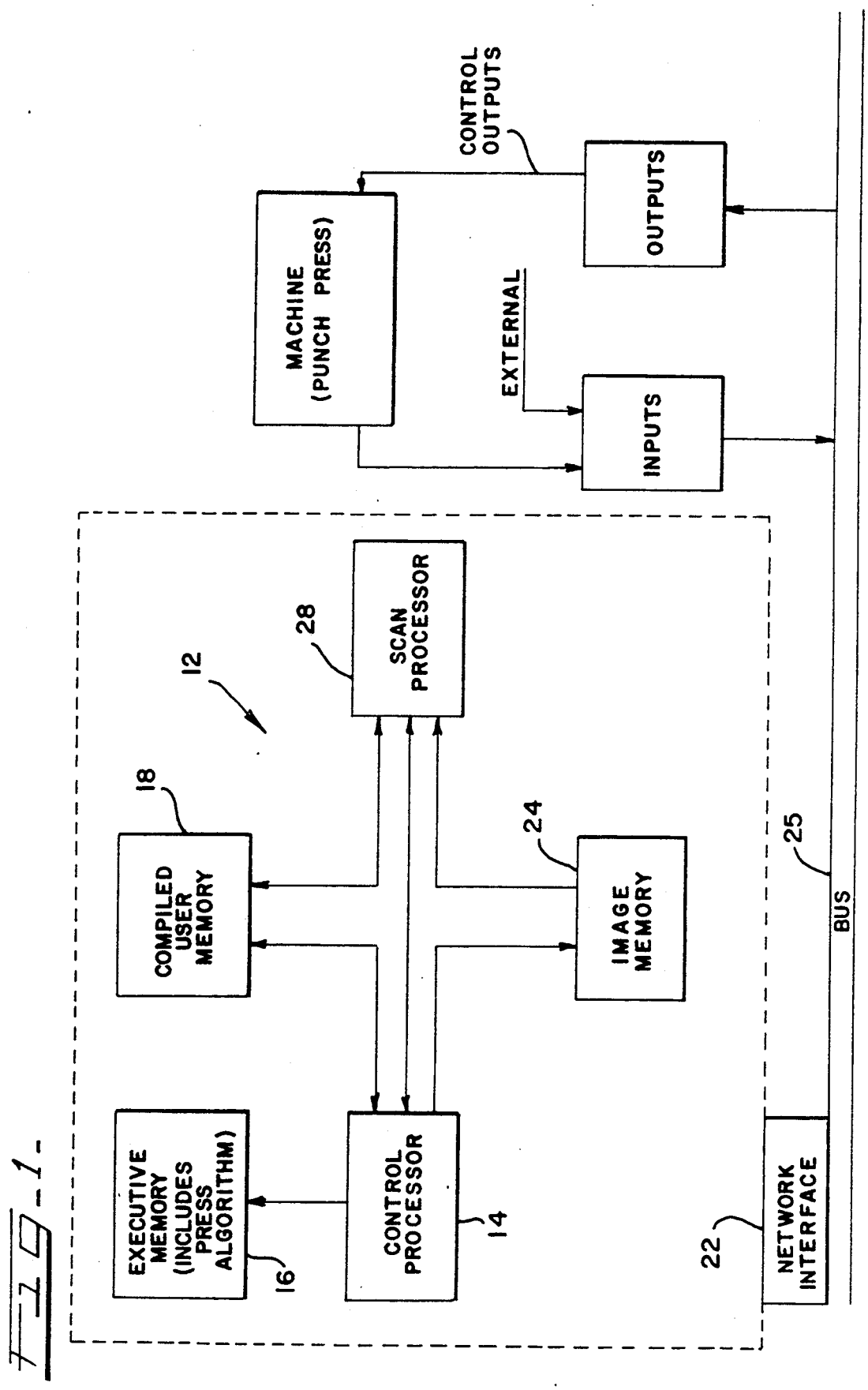
FIG. 1 is a block diagram indicating a punch press and material handling system controlled by a programmable logic controller (PLC) of the invention.

FIG. 1 shows a high-speed punch press 11 of the type which is controlled by the control system 12 of the invention. As will be readily appreciated, punch press 11 requires a multitude of controlled valve closures and openings, limit switches actuations, etc. to perform required functions. Further, these myriad of operations must be done quickly and precisely, and often in very rapid sequence. The control system 12 of the invention provides a punch press control having a particular microprocessor instructional operation of a special timed interrupt algorithm to achieve press operation of substantially 120 strokes per minute with a maximum of 64 valves or switches.

FIG. 1 shows a block diagram of the inventive control system 12 including a press algorithm 10 for controlling a high-speed press. The system 12 includes a control processor 14. Control processor 14, which may be of suitable known design, provides management functions for the system and coordinates the operation of all the components of system 12.

System 12 includes an executive memory 16 (which may be part of the control processor 14) and executive memory 16 includes the press algorithm 10. System 12 further includes a compiled user memory 18, a bus interface 22 and an image memory 24. The information to and from the system bus 25 is provided through bus interface 22. The system 12 also includes scan processor 28, to be described.

As mentioned, control processor 14 either performs or coordinates all processor system 12 operations. This includes performing all communication via a systems bus 25, and handling all interrupts and error conditions from the scan processor, communications interface network bus, and the remainder of the programmable controller system.

Compiled user memory 18 comprises a RAM and in operation contains a compiled version of the user program and press algorithm to serve as executable instructions for the scan processor. The compiled user memory 18 is randomly accessible by the control processor 14 for purposes of loading and editing user programs. The scan processor 28 accesses the compiled user memory 18 as an executive memory of successive instructions. The image memory 24 receives the input data from the control processor 14 and stores it for access by the scan processor 28.

As mentioned, the press algorithm 10 is included in the executive memory 16. On power-up, the algorithm 10 is transferred from the executive memory 16 to the compiled user memory 18.

FIG. 1 also indicates the high-speed punch press 11 and is connected through suitable input and output ports 30 and 31 to the network bus. The press 11 provides control and position input information to the control processor 14 through bus 25 and, as will be explained, control processor 14 provides control information to the press 11.

As will be explained in detail and as indicated in FIG. 4, the press control, algorithm 10 is executed by the PLC when it is interrupted after a specified amount of time and the PLC responds to specified inputs and control specified outputs and then return to the task that were interrupted. This interrupt method can be useful in applications where outputs need to respond to BCD data or digital inputs being sampled within a particular time limit or where input pulses need to be stretched to permit recognition during normal scan time of program.

The algorithm 10 (enabled such as by special LET instruction 200) consists of up to 64 executions of the sub-algorithm to control four consecutive output registers (64 outputs) from 8 consecutive input registers (128 inputs) or one BCD register, see FIG. 4 (special LET instructions 201 disables the interrupt algorithm).

Each of the executions of the sub-algorithm consist of a basic retentive ON/OFF (start/stop) function where outputs can be delayed either ON, OFF or both. TURN ON or TURN OFF selectibility is as follows:

| Definition | Turn On | Remarks |
| --- | --- | --- |
| On REM | Digital input/ internal | Output command on 0-1 Transition of "ON Remote" |
| ON Position | BCD On-Off Setpoints | Output command on 0-1 Transition of "CAM" created by on-off setpoints compared with BCD input |
| ON Tim | Either of above plus Time Delay | Delay turn on of output |
| Off REM | Digital input/ internal | Sets command to turn off |
| Off Pos | BCD On-Off setpoints | Sets command to turn off when cam created by on-off setpoints is not |

-continued

| Definition | Turn On | Remarks |
| --- | --- | --- |
| Off Tim | Either of above plus Time Delay or time delay after turn on | present Delay turn off of output |

The interrupt algorithm performs immediate I/O updates on specific BCD input and digital I/O every interrupt. A consecutive block of registers must be assigned to the algorithm with the start register selected in special instruction 200. The length of the block is in multiples of 15×number of executions of sub-algorithm.

The ladder program structure for enabling and disabling the press algorithm is as follows:

Algorithm Enable Rung
    Enable
                                SPEC
    —]Z[— LET (A) =(B) 200  ; (C) ; (D) ; (E) ; (F) ; (G)

where
  (Z)—enables Interrupt Algorithms when closed and algorithm previously disabled. Remaining closed or opening has no effect.
  (A)—Status register—any unused register used only with associated Enable/Disable Rungs. Bit 18 will come on if incorrect number of parameter programmed.
  (B)—1st register of block of parameter registers assigned to algorithm.
  (C)—Position input register.
  (D)—1st register of 8 consecutive input registers.
  (E)—1st register of 4 consecutive output registers separate from input registers.
  (F)—No. of executions of sub-algorithms used.
  (G)—Interrupt rate—multiples of 2.5 MS, (1×2.5 MS, 2×5 MS etc.

Note: Algorithm requires that 13 separate registers be assigned for I/O, one for position input, 8 input registers and 4 output registers.

Algorithm Disable Rung
    Disable
                                SPEC
    —]X[—   LET (A) = (B)   201

(X)—Disables algorithm Enable Rung when closed and algorithm previously enabled.
  (A)—Status register used in Enable Rung.

ENABLING AND DISABLING INTERRUPT

To enable the interrupt, a let statement with special instruction 200 and 5 parameters must be programmed. The let statement may be programmed and operates as standard except the parameters are stored when first enabled and opening the rung will not disable the interrupt. The interrupt will be activated on 2nd scan of rung (1st scan being dummy scan). Disabling the interrupt occurs when the processor goes to halt or a special instruction 201 let statement is programmed and enabled. Control register 8176 bit 25 is on when interrupt operating while bit 26 comes on after 1st interrupt is complete.

CHANGING PARAMETERS OF INTERRUPT ENABLE RING

As indicated above, the parameters of the special instruction 200 let rung are stored when first enabled. The parameters may be program-changed while the interrupt is operating but the interrupt will continue to run on the old parameters. The new parameters will take effect only after the interrupt is disabled and reenabled.

INTERRUPT ACTION

When the interrupt occurs due to an internal clock and repetitive rate programmed in enabling let statement, the processor interrupts the task being performed. The processor does an immediate input update on the position register and eight (8) consecutive digital registers (inputs).

Using the algorithm control parameters blocks of registers, the sub-algorithm is executed with the output image table updated if required as directed by output pointers and masks. The status of the sub-algorithm is reflected in the "Work" register of the block. This register is retentive and only changed by program control.

After all sub-algorithms requested have been executed, an immediate output update is performed from the four (4) consecutive registers defined as outputs.

INTERRUPT TIME

The length of the Interrupt takes time away from processing the ladder program and therefore the interrupt rate parameter, which is a multiple of the 2.5 MS interrupt interval, should be as high as possible. This is necessary to allow time between interrupts to process ladder program and communication.

SUB-ALGORITHM CONTROL PARAMETER REGISTERS

(Register Block Allocation)

The first thirteen registers of each group is used to provide operation data to the algorithm while the last 2 provide output or status. Note: The D prefix on following block of 15 register indicates relative order within block—not actual register number. Each register contains 16 bits.

Each of the registers D1–D7 will now be described starting with register D1.

| Register | Definition | Description |
| --- | --- | --- |
| D1 | Control | Selection of type of operation desired<br>Bit |
|  | On Pos | (1) Turn on with position-priority 4 |
|  | On Rem | (2) Turn on with input-priority 5 |
|  | On Time | (3) Delay turn on |
|  |  | (4) Not used |
|  | Off Poss | (5) Turn off with position-priority 1 |
|  | Off Rem | (6) Turn Off with input-priority 2 |
|  | Off Time | (7) Delay Turn Off-priority 3 |
|  |  | (8) Not used |
|  | Off Rem invert | (9) Invert Turn off input<br>0-normal input=0 to turn off |

-continued

| Register | Definition | Description |
| --- | --- | --- |
|  |  | 1-invert input=1 to turn off<br>(10) not used<br>(11) not used |
|  | Skip output | (12) Hold output in present state. Resets register D14 Bit 9 |
|  | Reset Tim Dly Disable | (13) Hold Time Delay reset and output in present state |
|  | Output | (14) Force Output off. Register D15 retains state. Sub-algorithm is active. |
|  | Skip Functn | (15) Skip sub-algorithm. Resets Register D15 Bit 9 while balance of D15 retain state. Sub-algorithm state is retained. |
|  | Exit | (16) Exit interrupt Algorithm operation until next interrupt. |
|  | Algorm | All remaining sub-algorithms retain last state. |

A description of registers D2 through D14 is as follows:

| Register | Def | Description |
| --- | --- | --- |
| D2 | On Pos. S.P. | Position on setpoint with range 0-9999 |
| D3 register | On Rem Pointr | "On Rem" (Remote) pointer-valid register is any assigned internal register or within Input Register block of up to 8 Register assigned in Enable Algorithm Rung. A zero in register defaults to "ON REM" open (0) condition |
| D4 | On REM Mask | "On REM" register mask-points to specific or combination of input bits required to be all "on" (1) to satisfy the REM "on" condition. If mask=0 the "ON REM" is considered to be open or off (0) |
| D5 | Off Pos Sp | Position off setpoint with range 0-9999 |
| D6 | Off REM Pointer | Off Rem register pointer valid register is same as for D3 |
| D7 | Off REM Mask | Off REM register mask points to specific or combination of input bits required to be all one (1) [Normal] or off (0) [inverted]. If not true or mask is zero, command to turn on is reset. |
| D8 | REM Ebl | REM enable register pointer-must be valid register Point same as register D3. If zero, Rem function is |

-continued

| Register | Def | Description |
|---|---|---|
| D9 | REM Ebl | enabled. REM enable register mask points to specific or combination of bits required to be all on (1). If not true, test of "ON REM" and "OFF REM" is bypassed and command (CMD) remains as is-on or off. If zero, REM function is enabled. |
| D10 | Output Point | Output register point-valid register is any assigned internal processor register or within assigned output register block in Enable Algorithm Rung. A zero pointer causes no output function. |
| D11 | Output Mask | Outpoint register mask points to specific or several outputs to be controlled from sub-algorithm. If zero, no output action takes place. |
| D12 | On Tim Sp | On Time Delay Setpoint-zero to 32767 decimal in interrupt rate parameter times 2.5 MSEC increments per count. Delays, in turn on of Internal Output (OUT AUX). |
| D13 | Off Tim Sp | Off Time Delay Setpoint-same as (D12) except delays Turn Off of internal output (out aux) |
| D14 | Curtim | Current ON/OFF timer count remaining status |
| D15 | Work | Sub-algorithm status register |

A definition of each of the 16 bits in the D15 status register is as follows:

| Bit | |
|---|---|
| CAM | (1) Cam on (1) or off (0) |
| CAMT | (2) CAM on transitional. "ON" (1) For one interrupt on 0 to 1 change of cam (Bit 1) |
| REM | (3) On Rem conditions determined by Rem Pointer and mask are true (1) or false (0) |
| REMT | (4) On Rem transitional. "On" (1) for one interrupt on 0 to 1 change of REM (Bit 3) |
| CMD | (5) Command On (1) or Off (0) to internal output auxiliary (outaux) either directly or after time delay. Turned on(1) with either CAMT (Bit 2) or REMT (Bit 4) and turned off (0) with either CAM off (BIT 1), OFF REM or delay as selected |
| Off Tim Enable | (6) Off timer enable is on (1) when timing or timed out and off (0) when timers held reset (D1−13=1) or CMD is on. |
| On Tim Enable | (7) On timer enable is on (1) when timing or timed out and off (0) when timers held reset (D1−13=1) or CMD is off. |
| Outaux | (8) Output auxiliary follows the CMD (bit 5) plus delays if used. Its |

-continued

| | Bit |
|---|---|
| 1st scan | state is loaded into output(s) as directed by output pointer and mask unless skip outputs (D17-12) is ON(1) or 1st scan (D15-9) is off (0) or output disable (D1-14) is on (1). (9) 1st scan completed flag is turned ON when sum algorithm has been executed. Turned off (0) if sub-algorithm skipped (D1−15=1) or output skipped (D1−12=1). Causes output to be held in present state until second interrupt cycle after 1st scan flag turned off (0) (10–16) Not used. |

REGISTER CHANGES

There are two bits available in Control Register D1 to either freeze the state of the sub-algorithm (Bit 15) or freeze the state of the output only (Bit 12) while allowing the sub-algorithm to respond to conditions. After either of these bits have been enabled and then disabled, the sub-algorithm will be active or one interrupt without affecting output. The control of the output by the sub-algorithm is disabled until the status register D15 bit 9 (1st scan) is on.

SUB-ALGORITHM OPERATION

Refer to the flow diagram of FIGS. 4A and 4B to consider the sub-algorithm operation. The steps are as follows:

1. Determine if sub-algorithm is to be skipped from state of D1-15. Skip if "on".
2. Determine if CAM (D15-1) created by ON and OFF position setpoints and position input is "on" or "off". Also whether CAM is transitioning from Off to On (D15-2=1).
3. Determine if "on remote" input is "on" or "off" (D15-3) and whether transition from "off" to "on" has occurred. (D15-4=1). Assumes "on remote" open if "on remote" pointers and/or mask is zero. Inputs may be any processor internal register bit.
4. Determine if command (D15-5) is "on" or "off" (D15-5) with off conditions checked before proceeding to on conditions. Assumes all enabling remotes=1 if remote enable input pointer and/or mask is zero. Assumes OFF and ON conditions as not true if associated input pointer and/or mask is zero causing turn off and *not* turn on of command. Note that command is turned on only with cam or on remote transition.
5. Determine if output auxiliary (D15-8) is "on" or "off" directly or through time delay path. If used the time delay is enabled preset and decremented on first pass through path and decremented on subsequent interrupts until zero. Enable Time Delay Reset (D1-13) will hold time preset. Note: Current time (D14) is only updated with remaining time while decrementing which is disabled by time delay reset enabled.
6. Determine if output is "on", "off" or bypassed. No action taken if either output pointer or mask is zero.

ALGORITHM EXECUTION TIME

Executing the special timed interrupt algorithm is the highest task of the processor. Once started, the algorithm cannot be interrupted and all other processor tasks are suspended.

Accordingly, to allow for proper operation of the processor, the algorithm must be limited to allow for sufficient time during each 2.5 MS clock pulse to handle communication tasks, processor housekeeping tasks and execute ladder. The maximum penalty for use of the maximum algorithm time will be a scan delay of 10 times normal for repetitive interrupts at 2.5 MS rate.

For example; the overall task time table is:
Communications—200 Us Minimum
Housekeeping—100 Us Minimum
Ladder—100 Us Minimum
Algorithm—100 Us Maximum To determine the length of the algorithm, the time for each execution of the sub-algorithm programmed is multiplied by the number of each type used and sum the totals. The maximum limit is 2100 Us.

ALGORITHM CONTROL PARAMETER REGISTER CHANGES

These registers are not changed while interrupt and sub-algorithms are actively controlling the output.

There are two bits available in Control Register D1 to either freeze the state of the sub-algorithm (bit 15) or freeze the state of the output only (Bit 12) while allowing the sub-algorithm to respond to conditions. After either of these bits have been enabled and then disabled, the sub-algorithm will be active for one interrupt without affecting output. The control of the output by the sub-algorithm is disabled until the status register D15 bit 9 (1st scan) is on.

The above method of removing the output from sub-algorithm control can also be used to provide manual control of the output to the ladder program.

The invention thus provides a PLC control system for a high-speed press utilizing a press algorithm, which algorithm includes a number of executions of a sub-algorithm, which enables precise, controlled high-speed operation of the press.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

While the specific embodiments have been illustrated and described, numerous modifications come to mind without significantly departing from the spirit of the invention and the scope of protection is only limited by the scope of the accompanying claims.

We claim:

1. A programmable logic controller (PLC) for controlling a high-speed machine operating in cycle-type modes, the machine having a plurality of components having at least two status states, the PLC comprising:
an executive memory,
an image memory including an input image table and an output image table,
a machine control algorithm,
an internal clock for generating repetitive timed interrupts,
a control processor for coordinating operation of the system in accordance with instructions contained in said executive memory, including updating of said image memory;
a communication bus adapted for communicating with the machine; and
a scan processor having its own executive memory, said scan processor for reading said input image table, executing said machine control algorithm and updating said output image table in response to said repetitive timed interrupts.

2. The PLC of claim 1, wherein the algorithm resides in said executive memory of said scan processor.

3. The PLC of claim 1, wherein the algorithm is executed in response to said repetitive timed interrupts by said scan processor.

4. The PLC of claim 1, wherein the algorithm comprises a multiple function block software.

5. The PLC of claim 1, wherein the algorithm comprises multiple executions of substantially the same sub-algorithm.

6. The PLC of claim 1, wherein the control processor provides control commands to said scan processor and receives inputs from said scan processor for communicating with the machine.

7. The PLC of claim 1, further including a user memory for containing the user program, and said user memory connecting directly to said scan processor, said user program controlling the operation and sequence of said scan processor.

8. The PLC of claim 1, wherein the repetitive timed interrupt is a multiple of 2.5 milliseconds and wherein the image memory is updated every scan cycle.

* * * * *